United States Patent [19]

Mucke

[11] 4,067,483

[45] Jan. 10, 1978

[54] METERING DEVICE FOR PLASTIC RAW MATERIALS

[75] Inventor: Walter Mücke, Hochberg, Germany

[73] Assignee: Filterwerk Mann & Hummel GmbH, Ludwigsburg, Germany

[21] Appl. No.: 642,796

[22] Filed: Dec. 22, 1975

[30] Foreign Application Priority Data

Dec. 21, 1974 Germany ............................ 2460996

[51] Int. Cl.[2] ............................................ G01F 11/24

[52] U.S. Cl. .................................. 222/222; 222/225; 222/342; 222/370

[58] Field of Search ............... 222/221, 222, 223, 225, 222/342, 370

[56] References Cited

U.S. PATENT DOCUMENTS

| | | | |
|---|---|---|---|
| 168,046 | 9/1875 | Morgan | 222/370 X |
| 1,566,187 | 12/1925 | Fifer | 222/370 X |
| 1,970,686 | 8/1934 | Bolen | 222/225 |
| 2,366,379 | 1/1945 | Bemis | 222/221 |

*Primary Examiner*—Allen W. Knowles
*Assistant Examiner*—Frederick R. Handren
*Attorney, Agent, or Firm*—Joseph A. Geiger

[57] ABSTRACT

A device for the metering of plastic raw materials of granulate, or pulverulent, or highly viscous consistency in connection with plastic materials processing machines, where a rotating metering disc at the bottom of a drum-shaped receptacle discharges fixed amounts of material at a predetermined frequency, and where the semi-circular metering pockets on the periphery of the metering disc are wiped clean by a vertically extending radially and circumferentially flexible wiper finger which dislodges any material that might otherwise adhere to the pocket flanks at the point of gravity discharge of the plastic material from the metering pockets.

19 Claims, 8 Drawing Figures

15 20 21 4 14 16 1 27 II II 33 23 3 26 13 24 9 5 34 III 28 2 III 12 6 10 7 11 22 8

1
2
3
4
5
6
7
8
9
10
11
12
13
14
15
16
20
21
22
23
24
26
27
28
33
34
II
II
III
III 11
12
23
40
24
11
4
2
14
33
27
25
10
3
1
11
12

12
1
11

26
2
23
39
11
40
14
14
34
10
39'
28
25
2
3
11
12

15
18
17
19
16
14
22

27
33

14
29
30
31
32
23
25
26
28
34
VI
VI
10
40
12
22
11

40
25
23
28
26
34
38
12
10
39'
39
14
41
11

23
27
26
25
33
29
14
32
30

METERING DEVICE FOR PLASTIC RAW MATERIALS

BACKGROUND OF THE INVENTION

1. Field of the Invention

The present invention relates to materials metering devices, and more particular to metering devices for the handling of granulate or pulverulent or highly viscous plastic raw materials which are being fed to plastic materials processing machines, such as injection molding machines and extruders, for example.

2. Description of the Prior Art

A wide variety of plastic materials metering devices are known from the prior art. This invention concerns itself specifically with the type of metering device in which a supply of raw material is stored inside an upright, generally cylindrical receptacle whose bottom section accommodates therein a rotating metering disc. The metering operation itself is performed by a number of apertures or metering pockets arranged at or near the periphery of the metering disc which, as it rotates, receives fixed amounts of raw material in its metering pockets and discharges the raw material through a discharge opening in the bottom section of the receptacle in a regular succession of uniform charges of raw material. While the metering pockets are open on the upper and lower sides of the metering disc, their lower side is normally covered and closed by the bottom wall of the receptacle bottom section, and their upper side is covered and closed off against the raw material in the receptacle in at least that angular range of travel in which the discharge through the receptacle bottom wall takes place. The metering pockets on the metering disc may be either a series of vertical throughbores arranged in the vicinity of the disc periphery, or they may be in the form of appropriate radial recesses on the disc periphery itself. These recesses require that a vertical wall portion of the receptacle bottom section engages the rotating disc with minimal clearance, in order to constitute an outer closure for the metering pockets.

A plastic materials metering device featuring the first-mentioned type of rotating metering disc is disclosed in German Pat. No. 1,947,405, where the metering disc has metering pockets in the form of throughbores arranged just inside the periphery of the metering disc. The raw material receptacle is a cylindrical drum which is supported on a matching bottom section, the circular metering disc having the same outer diameter as this drum, being positioned just underneath the latter, between it and the bottom section of the receptacle. In the angular region of the discharge opening in the receptacle bottom section is arranged a horizontally extending cover plate which prevents raw material from entering that metering pocket whose contents are just being discharged from the metering device. Ahead of the discharge position on the periphery of the receptacle is further arranged a stationary guide plate having a guide surface extending over the metering pockets in a slightly inclined orientation so as to exert a tamping and wiping effect on the contents of the metering pockets.

While the raw material carried inside the metering pockets enters the latter through gravity and is thereafter slightly compacted in a tamping action, the discharge of the material from the metering pockets is left entirely to gravity. This type of discharge may, however, amount to a serious shortcoming in connection with raw materials which have a pronounced tendency to pack together. These materials, especially the pulverulent type of materials, will adhere to the sides of the metering pockets and return to the receptacle, instead of falling out of them, when the pockets are opened. When this happens, the amounts of raw material which are actually being discharged are smaller than the intended amounts. The result is an uneven rate of material discharge and an overall deficit of material supplied to the mixing funnel of the plastic materials processing machine.

In the U.S. Pat. No. 2,366,379 is described a disctype metering device, where an attempt has been made to solve this problem by forcibly removing residual material from the metering pockets. A spring-loaded plunger is arranged above the metering pockets in the discharge position which, when a filled pocket arrives, enters into the latter and expulses its contents downwardly.

This arrangement, in order to work satisfactorily, requires a close fit between the plunger and the pockets and the latter must remain immobile while the plunger is engaged. The disc drive must therefore be intermittent and the plunger needs a separate drive means. Such an apparatus is slow and expensive.

SUMMARY OF THE INVENTION

Underlying the present invention is the primary objective of providing an improved metering device for plastic raw materials in which the above-mentioned shortcomings are eliminated, so that a consistently even rate of material charges is obtained, even with raw materials which have a tendency to stick to the flanks of the metering pockets.

The present invention proposes to attain the above objective by suggesting a metering device in which the metering pockets are arranged in the form of semi-circular recesses on the periphery of the metering disc and a metering pocket wiper means is arranged in the area of the discharge opening which, as a particular metering pocket passes over said opening, slides over the curved flanks of the metering pockets, thereby disengaging any raw material that might still be adhering to the flanks, instead of falling through the discharge opening into the mixing funnel arranged therebelow.

In a preferred embodiment of the invention, the wiping means takes the form of a long flexible wiper finger which is mounted above the discharge opening, having its upper end fixedly attached to the receptacle wall and its lower end biased radially inwardly so as to follow the semi-circular contour of the metering pockets in a wiping action. The wiper finger is preferably guided in its wiping motion by means of a special guide frame having a Y-shaped guide profile arranged at a short distance above the metering disc, whereby a cam curve of the guide profile cooperates with the curve of the metering pocket to forcibly move the wiper finger radially outwardly, as the radially oriented portion of the semi-circular flank of the metering pocket tends to deflect the wiper finger in the circumferential direction.

The wiper finger of the preferred embodiment thus executes not only a radial motion, it also deflects in the circumferential direction, thereby reducing the relative speed with which the wiper finger would otherwise have to move in the radial direction at the radially oriented leading and trailing flank portions of the metering pockets. The radial orientation of the flank end portions of the metering pockets has as its purpose to prevent the formation of a raw material wedge in the peripheral clearance between the rotating metering disc and the cooperating vertical wall portion of the receptacle bottom section. The shape of the cam portion on the Y-shaped wiper finger guide may be a straight incline, or an outwardly arched curve.

By way of a further refinement of the invention, the preferred embodiment further suggests a second wiper finger guide engaging the wiper finger in its upper half and which consists of a radially oriented guide slot inside which the wiper finger can execute radial motions, but has no space for circumferential deflections. The result of this second guide is to stiffen the wiper finger in the circumferential direction, by reducing its free length. This arrangement accelerates the return movement of the wiper finger, following its circumferential deflection. It assures that the deflected wiper finger will overcome the friction between the wiper finger and the periphery of the metering disc.

Depending upon the kinematic relationships between the speed of disc rotation, the angular spacing and width of the metering pockets, and the spring characteristics of the wiper finger, the latter may in fact overshoot its neutral position in the circumferential sense at the moment at which the leading edge of the next metering pocket arrives, or the neutral position of the wiper finger may be deliberately set somewhat ahead of the angular position of the guide slot of the Y-shaped guide profile. In both cases, the arrival of the leading edge of a metering pocket will release the wiper finger, which then moves inwardly, but is also circumferentially deflected in the sense of disc motion. The result is that the obliquely inwardly moving wiper finger stays closer to the contour of the metering pocket than a wiper finger which moves only radially inwardly.

In the preferred embodiment, the lower and upper wiper finger guides are parts of an integral guide frame which is mounted to the wall of the raw material receptacle below the attachment point of the wiper finger. Of course, the guide frame could also be extended upwardly, so that the attachment point of the wiper finger forms a part of the guide frame itself.

The guide finger is preferably a long thin spring steel rod, or a piece of heavy-gauge piano wire. It is attached to the receptacle wall by means of a rubber block into which its upper end portion is vulcanized. Since the entire length of the wiper finger is free in the radial direction and the rubber mounting block gives additional flexibility, a considerably gentler flexing action is obtained in the radial sense than in the circumferential sense, because the upper guide reduces the free length of the guide finger in the circumferential sense. The metering disc, the guide frame, and the wiper finger are readily detachable and interchangeable for a given device, thereby allowing for adaptation to different operating requirements.

The fact that the radial closure and the bottom closure of the moving metering pockets are constituted by stationary walls of the receptacle bottom section has the effect that the raw material contained inside a metering pocket tends to be more compact in the trailing—i.e. pushing—portion of the pocket, as compared to the leading forward portion of the pocket. This also means that materials with a tendency to pack against the flanks of the metering pockets will do so primarily on the radial trailing flank of the pocket. According to a still further refinement of the present invention, the preferred embodiment thereof further suggests that the wiper finger be so oriented that, while its deflection in the radial and circumferential sense necessarily means a certain angular deviation from the parallel vertical alignment with the flanks of the metering pocket, the orientation of the wiper finger be as near parallel as possible to the radial portion of the trailing flank. To this end, the lowermost portion of the wiper finger is preferably slightly kinked, so as to be vertical in the radially and circumferentially deflected position in which it engages said trailing radial flank portion. This alignment assures reliable discharge of any raw material that might otherwise adhere to the flanks of the metering pockets. A similar end result is obtainable, if the attachment point and the upper slot guide of the wiper finger are appropriately offset from the lower, Y-shaped guide profile in the radial and circumferential sense. In this case, the wiper finger could remain straight.

In order to conveniently accommodate the novel wiper finger and its guide frame inside the raw material receptacle, the latter has arranged at the inside of its generally cylindrical drum section an obliquely downwardly oriented partition wall. A wiper at the lower end of the partition wall engages the upper side of the rotating metering disc. The inclined partition wall thus produces a funnel-shaped raw material containing receptacle portion, while the wiping device of the invention is arranged underneath the inclined partition wall.

BRIEF DESCRIPTION OF THE DRAWINGS

Further special features and advantages of the invention will become apparent from the description following below, when taken together with the accompanying drawing which illustrates, by way of example, a preferred embodiment of the invention, represented in the various figures as follows.

DESCRIPTION OF THE PREFERRED EMBODIMENT

Figure 1:
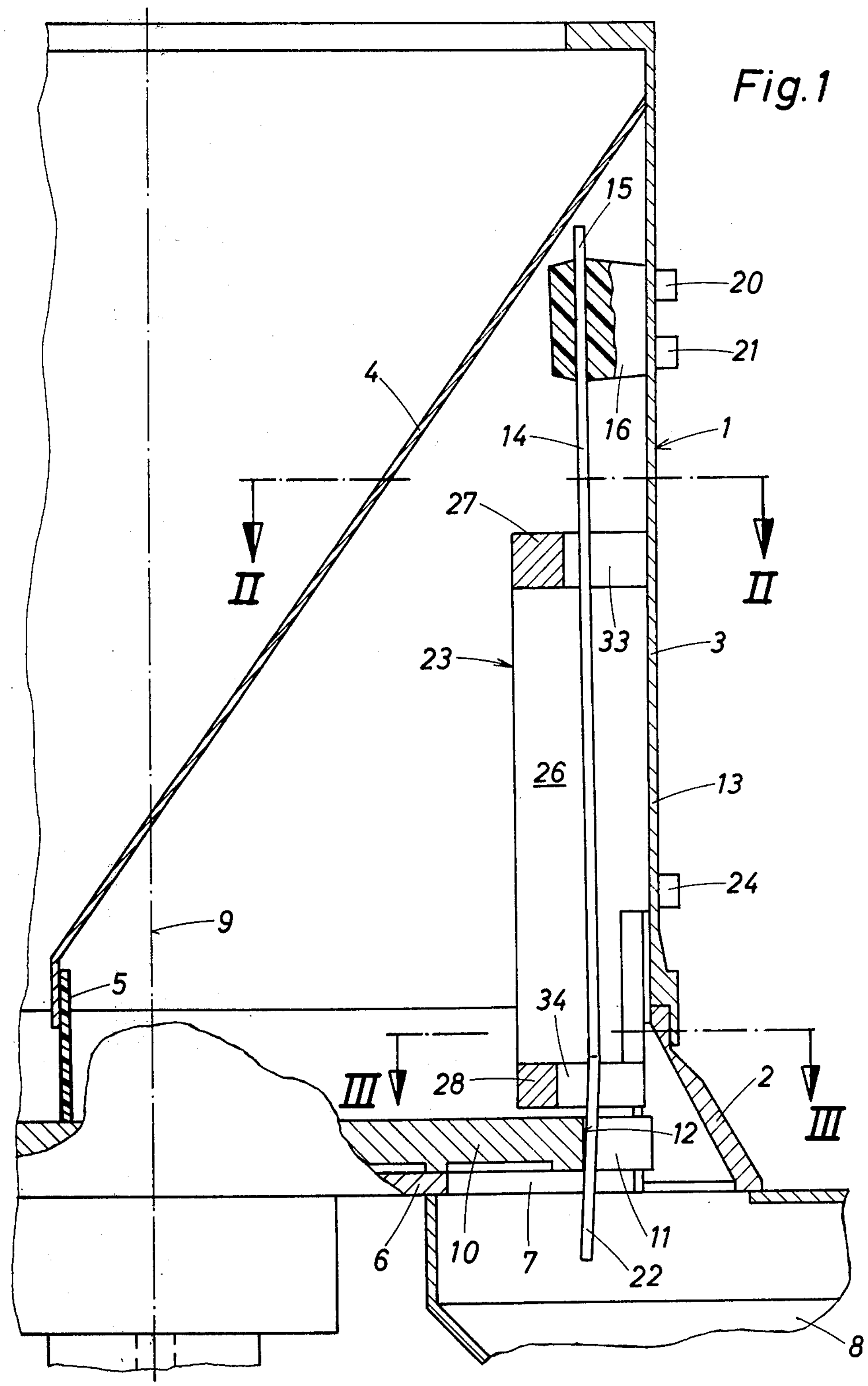
FIG. 1 shows an elevational axial cross section of a metering device embodying the invention.

Referring to FIG. 1 of the drawing, there can be seen the right-hand half of a cross-sectioned raw material receptacle 1, consisting essentially of a bottom section 2 and of a drum section 3 which is seated on top of the bottom section 2 with a centering ring shoulder. The drum section 3 is removably attched to the bottom section 2 by means of several quick-release latches (not shown). Inside the drum section 3 of the receptacle is arranged an oblique partition wall 4 subdividing the cylindrical space of the receptacle into a downwardly narrowing supply funnel on the left-hand side (partially cut off) and an empty space, or wiper space, to the right of and underneath the partition wall 4. A vertically oriented wiper 5, attached to the lower end of the partition wall 4, forms a sliding seal with the upper surface of a rotating metering disc 10. This metering disc 10 has parallel upper and lower faces and is received inside the bottom section 2 of the receptacle, being supported on the flat bottom wall 6 of the latter and forming a minimal circumferential clearance with a short cylindrical side wall of the bottom section.

At a point in the bottom section 2 which coincides approximately with the angular midpoint of the wiper space of the receptacle 1 is arranged a discharge opening in the bottom wall 6. This opening is situated immediately above the intake port of a mixer funnel 8, or of some other material receiving unit of a plastic materials processing machine. The metering disc 10, whose rotary axis is vertical and coincides with the axis of the raw material receptacle has arranged on its periphery a series of semi-circular recesses or metering pockets 11 (see FIG. 2). The metering pockets 11 have a vertical flank 12 extending axially across the width of the metering disc 10. As the metering disc 10 rotates, the pockets 11 first move through an angular range underneath the supply funnel where they are open to the raw material contained inside the latter, whereupon they leave the supply funnel range, moving past the wiper 5, from where they travel through an angular range in which they are open to the wiper space, carrying raw material inside of them. During all this time, the metering pockets 11 are closed on their lower side by means of the bottom wall 6 which is contiguous with the lower face of the metering disc, while a closure on the periphery of the metering disc is provided through the aforementioned short cylindrical wall portion of the bottom section 2, against which the disc 10 moves with minimal radial clearance. As soon as the full metering pockets 11 reach the angular position of the discharge opening 7, both their lower closures and radial closures are interrupted by the discharge opening and by a radial recess in the bottom section 2, respectively, so that the entrained raw material will fall from the metering pocket 11 into the funnel 8.

The metering disc 10 is engaged by a central drive shaft (not shown) which extends downwardly from the bottom section 2, the shaft being suitably journalled in a bearing extension of the bottom section. An electric motor with suitable electronic speed controls rotates the shaft and the metering disc 10 at a constant speed.

Figure 2:
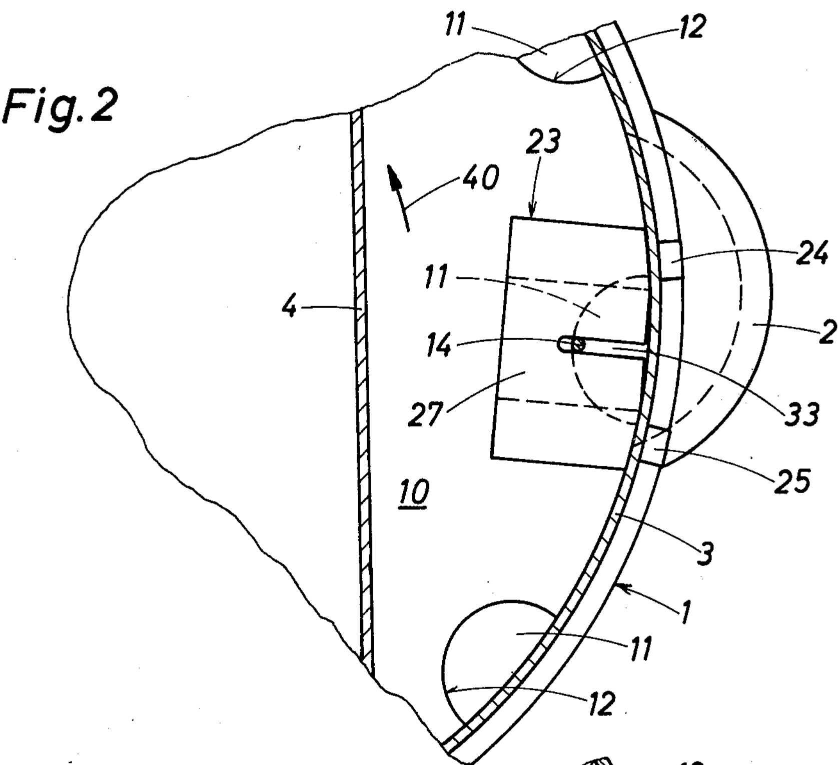
FIG. 2 is a partial transverse cross section along line II—II of FIG. 1.
Figure 3:
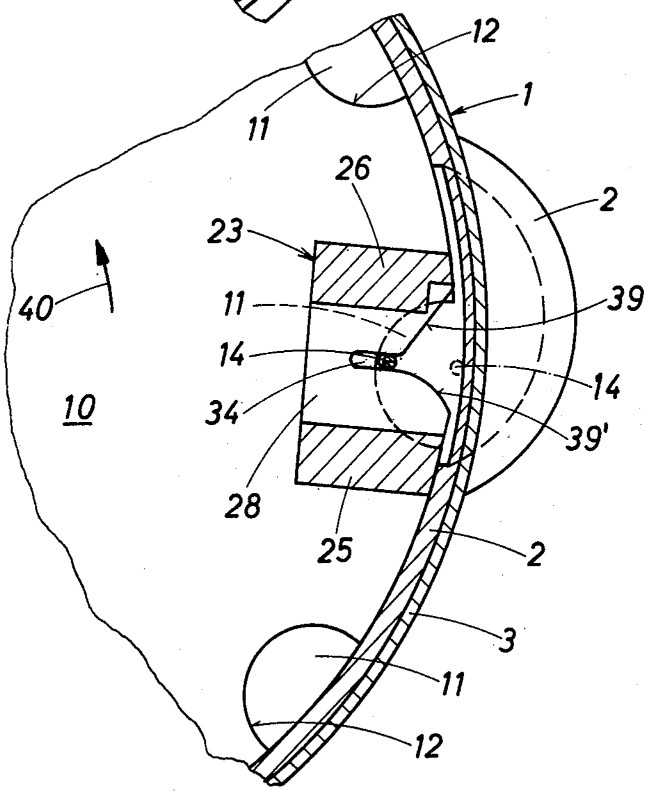
FIG. 3 is a similar partial transverse cross section along line III—III of FIG. 1.
Figure 4:
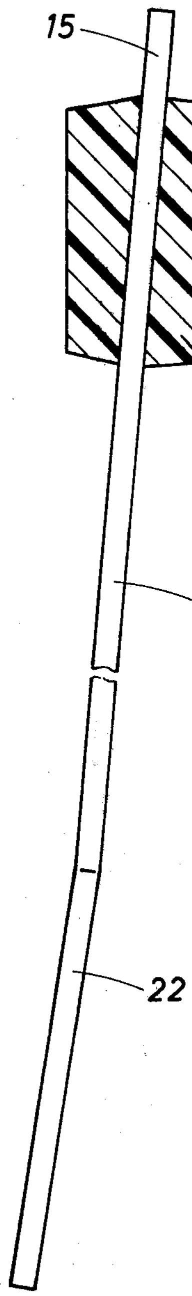
FIG. 4 shows the wiper finger of the invention separately and at an enlarged scale.

As is shown in the drawings, especially in FIGS. 1-3, that metering pocket 11 which is momentarily positioned above the discharge opening 7 is being engaged by a wiper finger 14, which is a thin flexible rod extending substantially vertically downwardly into the metering pocket 11. The upper end portion 15 of the wiper finger 14 is imbedded in an elastic mounting block by means of a vulcanized connection. As shown in FIG. 4, the elastic mounting block 16 also holds a mounting insert 17 by means of which the wiper finger assembly can be attached to the drum section 3 of the receptacle. Two clamping screws 20 and 21 engage the threaded bores 18 and 19 of the insert 17 for this purpose. This arrangement gives the wiper finger 14 a flexural pivot, due to the elasticity of the mounting block 16, the pivotability adding itself to the bending flexibility of the wiper finger. The latter can thus readily execute a radial motion equal to the radial depth of the metering pocket 11 in order to slide along the semi-circular contour of the metering pockets, as they move through the discharge range above the opening 7. FIG. 4 further indicates that the wiper finger 14 is slanted downwardly and inwardly in its free state, meaning that, in its mounted position, the finger 14 is biased radially inwardly against the flanks of the metering pockets 11. The wiper finger 14 is preferably a length of spring steel wire.

Figure 7:
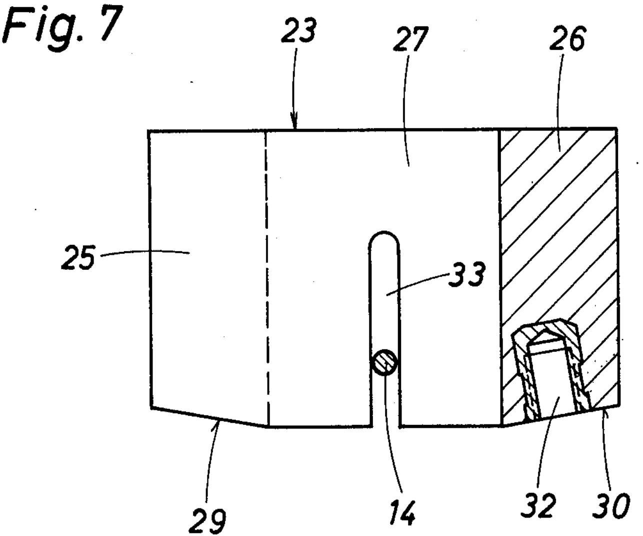
FIG. 7 is a plan view of the guide frame of FIGS. 5 and 6, with a portion thereof shown in cross section.

The wiper finger 14, being thus flexible in all directions, needs to be guided, in order to execute the desired wiping motion against the flanks of the moving metering pockets 11. This is accomplished by means of a guide frame 23 which guides the wiper finger 14 with a lower guide profile 34 arranged immediately above the metering disc 10 and an upper guide profile 33 arranged in the upper half of the guide finger length. Two lateral frame members 25 and 26 connect these cross members, forming with them a rectangular frame which is attached to the drum section 3 by means of two screws 24. Since the guide frame 23 is preferably an injection molded part, suitable threaded inserts 31 and 32 are provided in the frame members 25 and 26, as can be seen in FIG. 7. That figure also indicates that the guide frame has two slightly slanted mounting faces 29 and 30 adapted to fit the curvature of the wall 13 of the drum section 3.

FIGS. 2 and 3, and FIGS. 6 and 7, respectively, show the shapes of the upper and lower guide profiles 33 and 34. There, it can be seen that the upper guide profile is a straight radially oriented slot which, while permitting radial movements of the wiper finger 14, does not allow for any circumferential movement of the latter at this level. In contrast, the lower guide profile 34 is Y-shaped in outline, meaning that, as the lower end portion 22 of the wiper finger 14 is engaged by the progressively steeper flank of the metering pocket 11, the retaining wiper finger guide recedes in the direction of disc rotation. This receding portion or cam portion 39 of the guide profile thus cooperates with the trailing, progressively steeper flank portion 12 of the metering pocket 11 in the manner of scissors cams forcing the guide finger 14 to move radially outwardly along the trailing flank portion 12, as the latter deflects the finger in the circumferential sense along the cam 39. Ideally, the curvature of the cam 39 would be an arc similar to the curvature of the metering pocket flank so that the enclosed angle between the advancing flank portion 12 and the cam against which the wiper finger 14 rides is approximately the same in all radial positions of the finger. For the sake of simplicity, however, the guide profile 34 is Y-shaped, being composed of a slot portion 38 and of a straight-line inclined cam 39, which is angled approximately 50 degrees from the radial direction.

Figure 6:
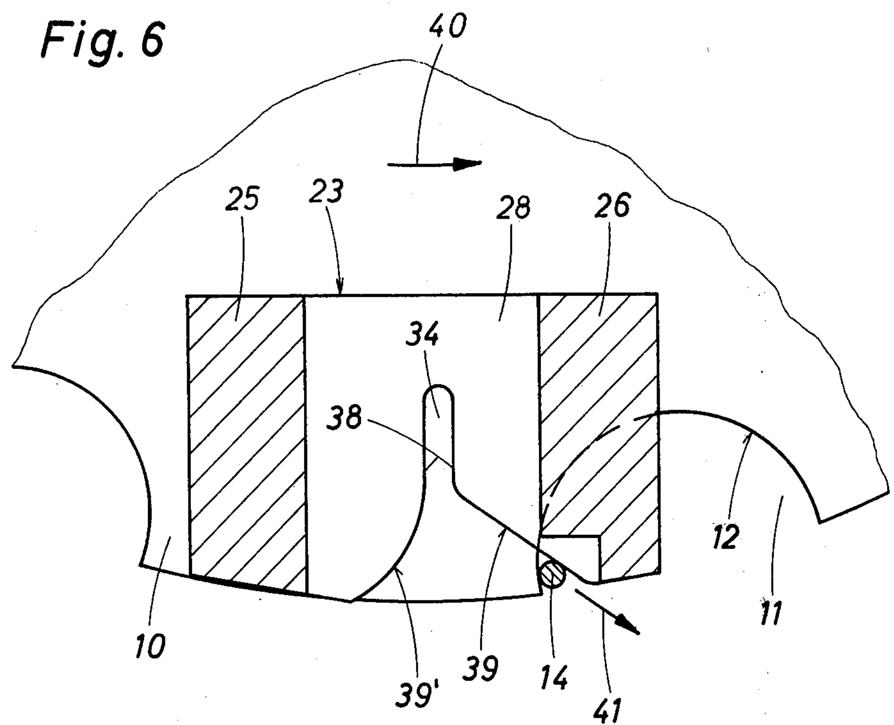
FIG. 6 is a transverse cross section along line VI—VI of FIG. 5.

FIG. 6 shows the cooperation of the flank portion 12 of the metering pocket 11 with the cam portion 39 of the lower wiper finger guide profile 34. The wiper finger 14 is shown near the periphery of the metering disc 10, at a radius of the latter at which the trailing flank portion 12 is approximately radially oriented. This means that the wiper finger 14 must move circumferentially with the flank portion 12. However, the inclined stationary cam portion 39 prevents the wiper finger 14 from advancing in a purely circumferential direction, deflecting it with a radial movement component in the direction 41 along the cam portion 39. This scissors action between the advancing flank portion 12 and the stationary cam portion 39 will continue until the wiper finger 14 snaps over the corner of the metering pocket 11, whereupon it slides along the periphery of the metering disc 10 in the direction opposite to the movement of the latter, under its own stored spring energy.

Normally, the neutral position of the wiper finger in the circumferential sense is one in alignment with the slot portion 38. However, the neutral position may also be chosen to be further left in FIG. 6, in order to obtain an earlier entry of the wiper finger 14 into the leading portion of the succeeding metering pocket 11. This entry is facilitated by a second cam portion 39' on the opposite side of the previously described cam portion 39. Unlike the latter, the entry cam portion 39' has an arcuate outline. Its purpose is to give the radially inwardly moving wiper finger 14 a circumferential motion component in the direction of disc rotation (arrow 40). This circumferential motion component is initially larger and decreases with increasing radial advance of the wiper finger 14. It thus corresponds to the leading flank portion of the metering pocket 11 which, in order to be touched by the wiper finger 14, requires an initially higher radial speed of the latter, which will then decrease rapidly, as the wiper finger passes over progressively more tangentially oriented flank portions.

Instead of having a neutral position of the wiper finger 14 which is located circumferentially ahead, i.e. to the left of the guide profile 34 in FIG. 6, it is also possible to arrange the kinematic relationships between the spring return movement of the circumferentially deflected wiper finger 14 and the arrival of the leading edge of the succeeding metering pocket 11 in such a way that the latter takes place at a moment at which the circumferentially returning wiper finger 14 has just overshot its neutral position and is about to reverse its movement. The arrival at this moment of the leading edge of a metering pocket means that the wiper finger 14 will execute both a radially inwardly directed movement component and a circumferentially forwardly directed movement component under its own two-directional spring bias. This composite movement is assisted by the curvature of the cam portion 39', if necessary.

Figure 8:
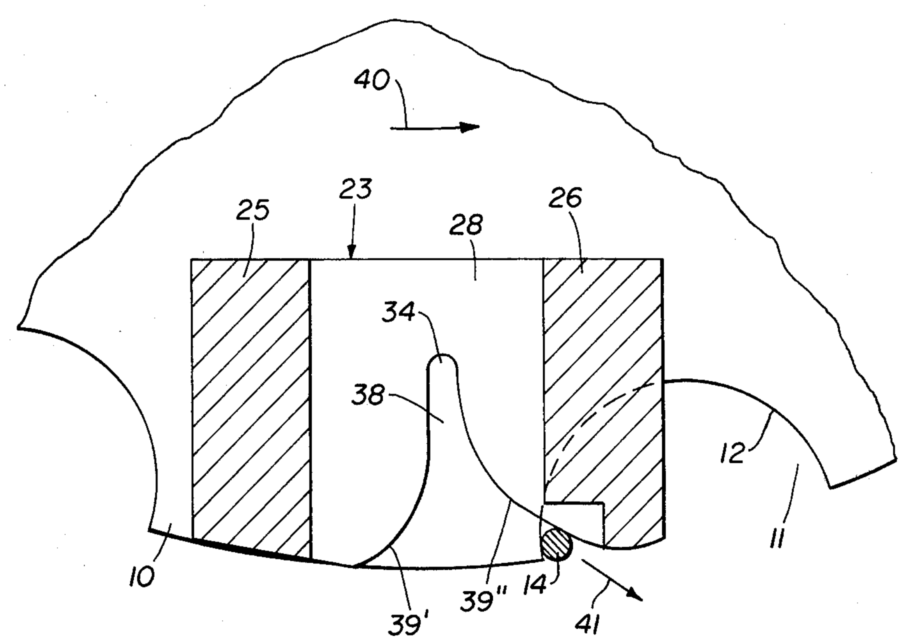
FIG. 8 is similar to FIG. 6, showing a modified guide frame.

As can be seen in FIG. 8, the cam portion which deflects the wiper finger 14 radially outwardly, can also have an arcuate contour 39'' similar to that of the entry cam portion 39'. This makes it possible to reverse the rotation of the metering disc.

Figure 5:
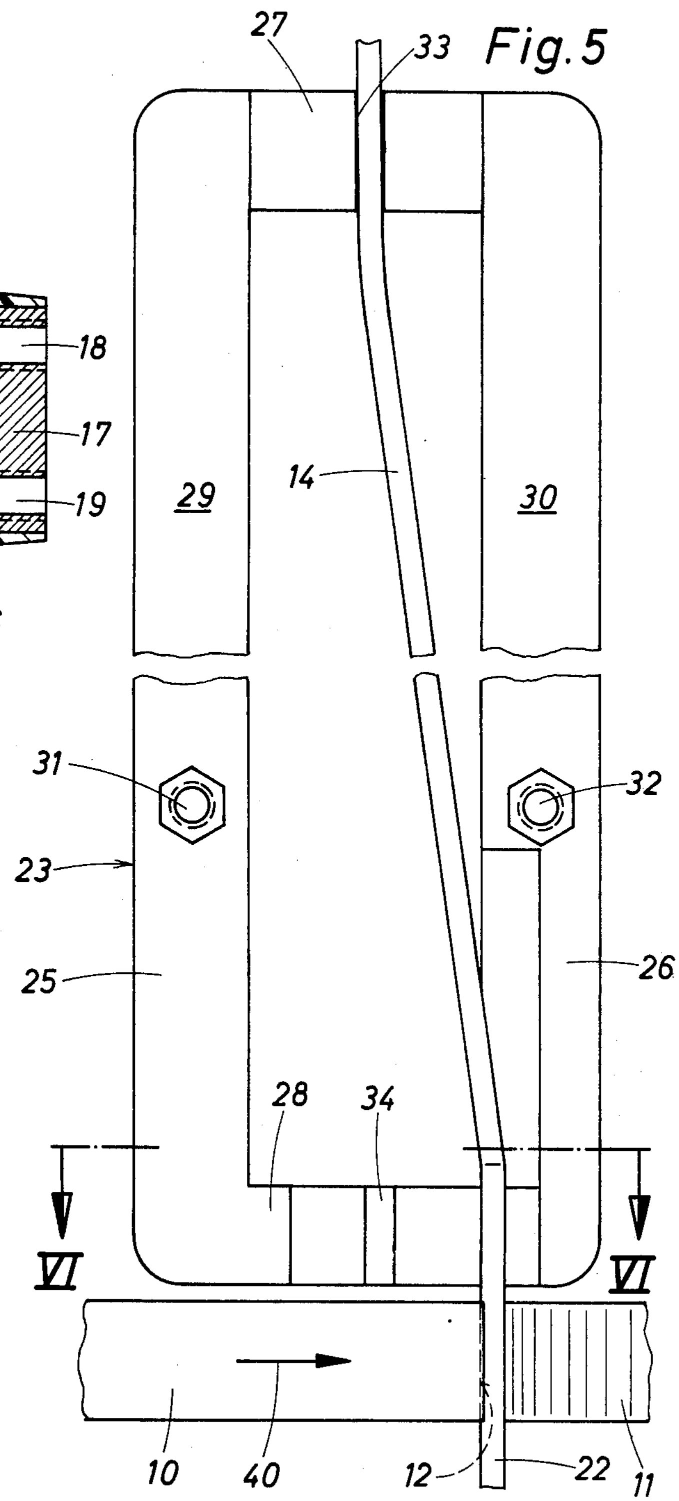
FIG. 5 shows portions of the wiping means of the present invention at an enlarged scale, as seen when the receptacle wall is cut away.

FIGS. 4 and 5 indicate that the lower end portion 22 of the wiper finger 14 is slightly angled with respect to its remaining length portion. The purpose of this configuration is to have the wiper finger portion 22 in parallel alignment with that flank portion of the metering pocket 11 where wiping is most important, rather than having the wiper finger in alignment with a median point of the metering pocket flank. This most important flank portion is the trailing or pushing portion of the metering pocket, especially its radially oriented flank portion, against which the conveyed material is compacted under the friction effect between the conveyed raw material inside the pocket 11 and the stationary bottom and side wall of the bottom section 2. Material with great adherence, especially pulverulent material, then develops a tendency to adhere to this radially oriented flank portion. FIGS. 5 and 6 show the wiper finger 14 in contact with this flank portion. As FIG. 5 indicates, the wiper finger end portion 22 is parallel to this flank portion 12 in its circumferentially deflected orientation, having a kink just above the lower guide profile 34, in order to also engage the latter in parallel alignment of this wiping position. This means, on the other hand, that the other wiping positions on the flanks of the metering pocket 11 and the other guide positions on the lower guide profile are somewhat out of alignment.

As FIG. 1 indicates, a similar situation is present in connection with the radial orientation of the wiping finger 14 which is also slightly bent in that direction, so that the lower wiper finger end portion 22 is parallel to the peripheral surface of the metering disc 10. It will be noted that the trailing flank portion 12 and the periphery of the metering disc against which the wiper finger 14 slides are also those portions against which the wiper finger 14 exerts a maximum pressure. The parallel alignment of the wiper finger 14 with the flank portion 12 thus also assures that any wear that might take place over an extended period of time will take place evenly over the entire height of the metering pocket flank portion 12.

It is, of course, also possible to obtain the same effect with a straight wiper finger, if the latter is arranged at an angle with respect to the center axis of the apparatus, said angle corresponding to the angle of wiper finger deflection in the crucial position of FIG. 5, so that the fully deflected end portion 22 of the wiper finger 14 is then vertical. This would mean, however, that the upper guide profile 33 would have to be circumferentially offset with respect to the lower guide profile 34 and that the upper wiper finger portion 15 would have to be located much closer to the wall 13 of the drum section 3.

In operation, the metering disc 10 rotates at a constant speed, whereby the metering pockets 11 travel first through a filling range located underneath the raw material containing supply funnel inside the receptacle 1. Some of the raw material contained inside this supply funnel falls into the moving metering pockets 11, the receptacle 1 being intermittently replenished by hand or by means of some suitable conveying device. The full metering pockets, after passing underneath the wiper 5 of the partition wall 4, arrive in the area of the discharge opening 7 and wiper finger 14, where at least the major portion of the raw material immediately falls into the funnel 8. Any residual material adhering to the metering pocket flank 12 is removed through the wiping action of the wiper finger 14. The latter thus operates automatically and without being mechanically driven.

While the wiper finger 14 has a comparatively short free length in the circumferential direction, for a rapid return motion after deflection, its flexibility in the radial direction is much greater, due to the pivotal flexibility of the elastic mounting block 16 and the added flexibility of the wiper finger 14 itself, which has no confinement in the radial direction.

The arrangement of the partition wall 4 inside the raw material receptacle 1 provides a convenient mounting space for the novel wiping device. The latter is readily accessible for inspection and/or removal, after the drum section 3 has been lifted from the bottom section 2 of the receptacle. The metering disc 10 being designed for interchangeability with other metering discs that may have metering pockets of different size and/or circumferential spacing, it would also be possible to readily interchange a particular wiper assembly against a different assembly, should the use of a different metering disc 10 necessitate such a change.

It is not a prerequisite for the use of the present invention that the shape of the peripheral metering pockets 11 be semi-circular, though that shape is preferable. It is further possible to use a metering disc 10 whose metering pockets have flanks which are not parallel to the rotational axis of the metering disc. Thus, it is possible to modify the metering pocket flanks in such a way that their inclination is adapted to the various angles assumed by the wiper finger 14, so that a line contact between the latter and the flanks would be obtained over the entire contour of the metering pockets.

It should be understood, of course, that the foregoing disclosure describes only a preferred embodiment of the invention and that it is intended to cover all changes and modifications of this example of the invention which fall within the scope of the appended claims.

I claim the following:

1. A device for metering granulate, or pulverulent, or highly viscous materials, particularly plastic raw materials which are being fed to a plastic material processing machine, the device comprising in combination:

a receptacle having a bottom section and a side wall arranged to return therein a supply of raw material;

a metering disc rotatably arranged in the bottom section of the receptacle and having a substantially vertical rotational axis, said metering disc constituting at least a portion of a material retaining bottom wall of the receptacle;

drive means for rotating the metering disc about its axis;

a series of metering pockets disposed on the periphery of the metering disc in the form of angularly evenly spaced radially and vertically open recesses having substantially vertical flanks;

a discharge opening in the receptacle bottom section, underneath the metering disc, at a location over which the metering pockets move and where the metering disc does not constitute a material retaining bottom wall of the receptacle;

a side wall portion in the receptacle bottom section cooperating with the periphery of the metering disc in such a way as to form a stationary radial closure for the moving metering pockets, and a bottom wall portion of the receptacle bottom section cooperating with the lower side of the metering disc in such a way as to form a stationary bottom closure of the moving metering pockets; said radial closure and bottom closure of the metering pockets being interrupted in the area of the discharge opening, thereby allowing raw material contained in the moving metering pockets to be discharged therefrom by gravity; and radially movable wiper means arranged in the area of the discharge opening and engaging the periphery of the rotating disc so as to cooperate therewith and with the metering pockets by sliding along the contour of the pocket flanks, as each metering pocket passes over said opening, thereby dislodging from said flanks any residual raw material adhering thereto.

2. A metering device as defined in claim 1, wherein the wiper means includes a substantially vertically extending wiper finger and means for resiliently biasing the wiper finger in the direction against the metering pocket flanks to produce said sliding engagement.

3. A metering device as defined in claim 2, wherein the wiper finger moves radially inwardly under the influence of said biasing means, and moves radially outwardly, against said biasing means, as a result of a cam-and-follower engagement between the rotating metering disc and the wiper means.

4. A metering device as defined in claim 3, wherein the flanks of the metering pockets serve as the cam, and the wiper finger is the cam follower in said cam-and-follower engagement.

5. A metering device as defined in claim 2, wherein the biasing means for the wiper finger includes spring means which are effective in the radial sense of the metering disc and spring means which are effective in the circumferential sense of the metering disc;

the radial bias exerted on the wiper finger by the radially effective spring means is such that a radially inwardly directed preload is active on the wiper finger in any of its radial positions; and the circumferentially effective spring means is designed to return the wiper finger to a central position, following any circumferential deflection.

6. A metering device as defined in claim 5, wherein the wiper finger is an elongated resiliently flexible rod-like member engaging the flank of a metering pocket with one end portion and having a mounting attachment to a stationary part of the metering device at its other end portion; and the mounting attachment of the wiper finger produces its radial bias.

7. A metering device as defined in claim 6, wherein said mounting attachment of the wiper finger is a flexural pivot.

8. A metering device as defined in claim 6, wherein the wiper finger has one end portion thereof pivotably attached to the inside wall of the receptacle, above said discharge opening in its bottom section, reaching downwardly therefrom, and the pivot attachment is a resilient mounting block which is vulcanized to said wiper finger end portion while being attached to a stationary part of the metering device.

9. A metering device as defined in claim 5, wherein the wiper finger is an elongated resiliently flexible rod-like member engaging the metering pocket with one end portion thereof; and the device further comprises stationary wiper finger guide means arranged immediately above the metering disc and cooperating with the metering pocket flanks in the manner of scissors cams engaging the free end portion of the guide finger from two directions, so as to move the wiper finger with a radially outwardly directed motion component against its radial biasing means.

10. A metering device as defined in claim 9, wherein the wiper finger guide means includes a first cam portion facing radially outwardly and circumferentially against the direction of movement of the metering pockets, so that the wiper finger is deflected radially outwardly when, in contact with the trailing flank portion of the metering pocket, it is pushed circumferentially against the cam portion.

11. A metering device as defined in claim 10, wherein said cam portion of the wiper finger guide means has a curvilinear contour whose angle of inclination from the radial direction increases with increasing radial distance in approximately the same progression as a tangent to the metering pocket flank at the point of wiper finger contact approaches in its inclination the radial direction, so that the angle enclosed between the contact points of the wiper finger with the cam portion and with the metering pocket flank remains approximately the same.

12. A metering device as defined in claim 9, wherein the metering pockets on the periphery of the metering disc are semi-circular in outline, having substantially radial flank portions at the corners defined by the pocket outline and the disc periphery; and said cam portion of the wiper finger guide means has an arcuate contour with an inner radially oriented end portion and an outer approximately tangentially oriented end portion.

13. A metering device as defined in claim 9, wherein the wiper finger guide means includes a second cam portion facing likewise radially outwardly, but circumferentially in the direction opposite the first cam portion, so as to define with the latter a generally Y-shaped or V-shaped guide profile.

14. A metering device as defined in claim 13, wherein the wiper finger biasing means is arranged for wiper finger deflection in both circumferential directions; and the first and second cam portions of the wiper finger guide means are arranged to cooperate with the wiper finger in both directions of disc rotation.

15. A metering device as defined in claim 13, wherein at least one of the two cam portions of said guide profile includes an inner radially oriented portion and an outer inclined straight-line portion.

16. A metering device as defined in claim 9, further comprising an upper guide profile in the form of a radially oriented slot engaging the wiper finger at a point intermediate its attached and free end portions, thereby reducing the circumferential flexibility of the wiper finger.

17. A metering device as defined in claim 16, wherein the wiper finger guide means and the upper guide profile are part of an integral guide frame which is mounted on the wall of the receptacle above its discharge opening and below the wiper finger attachment.

18. A metering device as defined in claim 5, wherein the wiper finger has its upper end portion attached to a stationary part of the device so that its lower end portion, when radially or circumferentially deflected, executes a pivoting-type deflecting motion; and the deflected lower end portion of the wiper finger is so oriented in relation to the flank of the metering pocket that it extends substantially parallel to at least that material pushing portion of the flank which faces most nearly in the direction of pocket movement.

19. A metering device as defined in claim 18, wherein the contour of the metering pockets is semi-circular and has a vertical flank;

the wiper finger extends generally vertically in substantially parallel alignment with the rotational axis of the device, when engaging the bottom of a metering pocket; and the lower portion of the wiper finger is slightly kinked, giving that end portion an angle relative to the vertical wiper finger portion which, when the wiper finger is deflected towards said material pushing flank portion, is substantially parallel to the latter in the radial as well as the circumferential sense.

* * * * *